March 13, 1951 C. A. THOMPSON 2,545,122
ATTACHMENT FOR REVOLVING EQUIPMENT
Filed Sept. 27, 1949
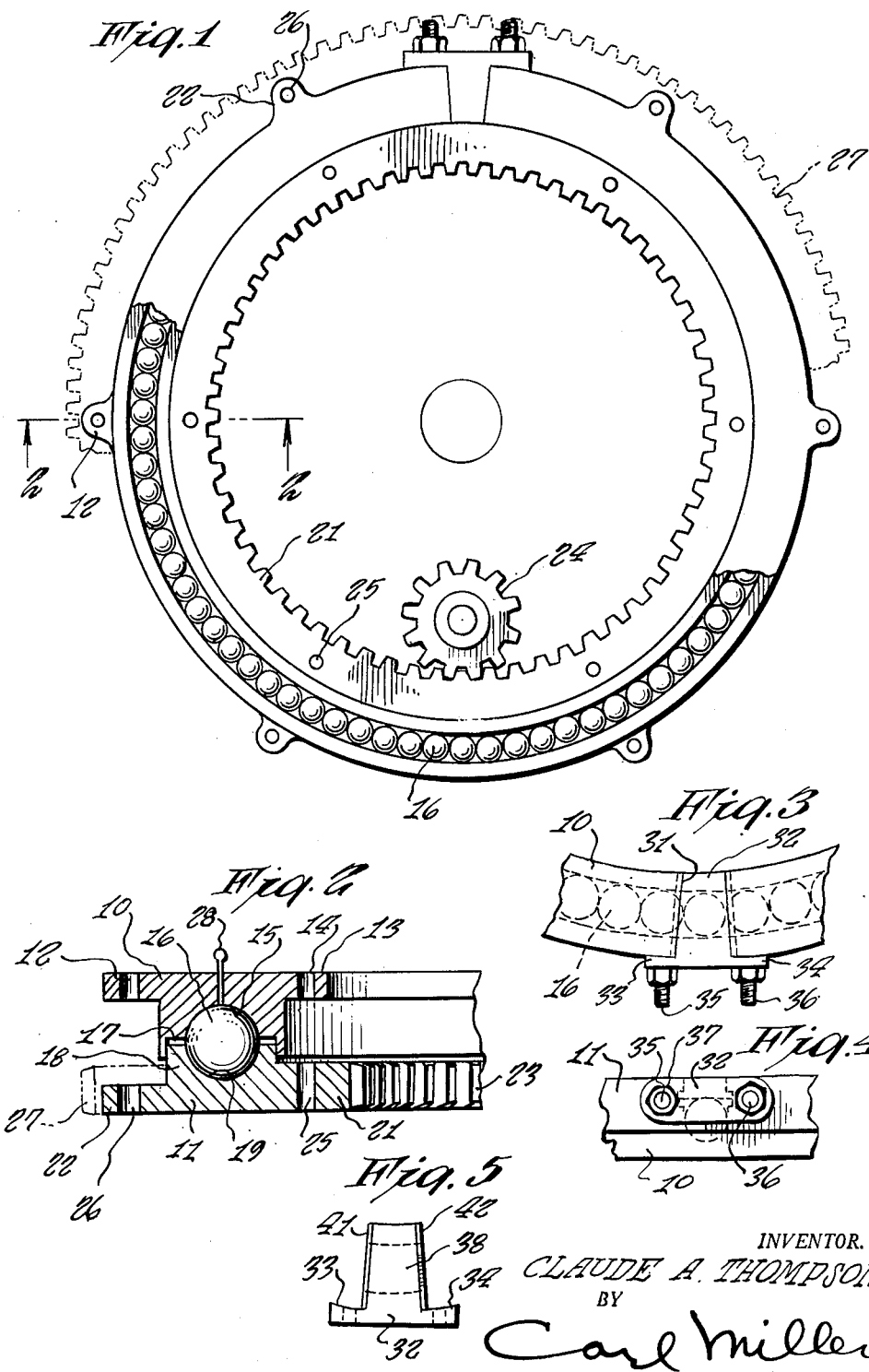
INVENTOR.
CLAUDE A. THOMPSON
BY
Carl Miller
ATTORNEY Patented Mar. 13, 1951

2,545,122

UNITED STATES PATENT OFFICE 2,545,122

ATTACHMENT FOR REVOLVING EQUIPMENT

Claude A. Thompson, Victoria, Tex.

Application September 27, 1949, Serial No. 118,111

1 Claim. (Cl. 308—221)

This invention relates to an attachment for revolving equipment.

It is an object of the present invention to provide an attachment for revolving equipment such as drag lines, cranes and shovels which will provide the equipment with a ball bearing assembly on which the same can be operated and wherein one of the races includes either external or internal gear teeth, while the other race may serve as a support for the connecting of the assembly to a fixed member and wherein access can be readily had to the interior of the race members for the removal or changing of the ball bearings.

Other objects of the present invention are to provide a revolving attachment for revolving equipment which is of simple construction, inexpensive to manufacture, easy to install upon the equipment, compact, has a minimum number of parts, and efficient in operation.

For other objects and for a better understanding of the invention, reference may be had to the following detailed description taken in connection with the accompanying drawing, in which Fig. 1 is a fragmentary end elevational view of the attachment with portions broken away to show the arrangement of the balls between the inner and outer races.

Fig. 2 is an enlarged fragmentary sectional view taken generally on line 2—2 of Fig. 1.

Fig. 3 is an enlarged fragmentary and elevational view taken of the removable section part of the attachment to illustrate the manner in which the removable section can be removed and the balls can be taken from the attachment.

Fig. 4 is a fragmentary bottom plan view of the removable section and of a portion of the attachments surrounding the removable section.

Fig. 5 is an elevational view of the removable section free of the attachment.

Referring now to the Figures 10 and 11 represent respectively upper and lower races forming the attachment. The race 10 has flanges 12 and 13 with openings 14 therein by which the attachment can be connected to a support or other body. The upper race is channeled or grooved, as indicated at 15, to receive balls 16. The upper race 10 is also recessed, as indicated at 17, to receive an inwardly projected portion 18 of the lower race 11. This lower race 11 is also grooved, as indicated at 19, to receive the ball bearings 16. By the insertion of the projection 18 into recess 17, the races 10 and 11 are held against lateral displacement from one another.

The lower race 11 has a peripheral flange 21, which may have gear teeth 23 adapted to be engaged by a pinnion 24 which may serve to rotate the lower race 11. The lower race has holes 25 in the flange 21 so as to enable the lower race to be fixed to a support. Projections 22 are preferably in the form of lugs with holes 26 disposed respectively therein. Likewise, the flange 12 of the upper race 10 can be of similar form.

If desired, an external ring gear 27 can be attached to lugs 22 and engaged by a pinnion lying externally of the attachment.

On the inner race there may be provided a grease fitting 28 for injecting grease between the inner and outer races.

In order that the ball bearings can be easily inserted or removed, the upper race 10 is provided with a radially extending recess 31 adapted to receive a removable section 32 having side flanges 33 and 34 through which bolts 35 and 36 may respectively extend. These threaded members are secured to the race and receive respectively nuts 37 to hold the removable section 32 in place. The removable section has an arcuate recess 38 conforming generally to the ball bearing grooves in the race and through which the balls can pass when the removable section is tightly fixed in place. The sides of the recess 31 are grooved to receive slide projections 41 and 42 on the removable section. The recess 31 extends through the inner and outer peripheries of the upper race.

It should be distinctly understood that the upper and lower bearing rings can be welded, riveted or bolted, as may so be desired to the supports to which they are to be attached.

While various changes may be made in the detail construction, it shall be understood that such changes shall be within the spirit and scope of the present invention as defined by the appended claim.

Having thus set forth and disclosed the nature of my invention, what is claimed is:

A ball bearing attachment having upper and lower races, each of said races having grooves therein, balls disposed between the grooves of the races, one of said races having a recess extending through the inner and outer peripheries thereof and through which balls may be inserted or removed, the sides of said recess having guide formations, a removable section slidable into the recess and having guide formations engaging with the respective guide formations of the recess, said removable section having flanges adapted to abut the outer periphery of the race, said removable section having an arcuate groove conforming generally to the groove of the races to permit the movement of the balls under the section, and means for securing the flanges of the section upon the periphery of the race.

CLAUDE A. THOMPSON.

REFERENCES CITED

The following references are of record in the file of this patent:

UNITED STATES PATENTS

| Number | Name | Date |
|--------|------|------|
| 426,271 | Herman | Apr. 22, 1890 |
| 818,787 | Radar et al. | Apr. 24, 1906 |
| 825,417 | Rivett | July 10, 1906 |
| 2,313,084 | Manly | Mar. 9, 1943 |